United States Patent Office 3,326,343
Patented June 20, 1967

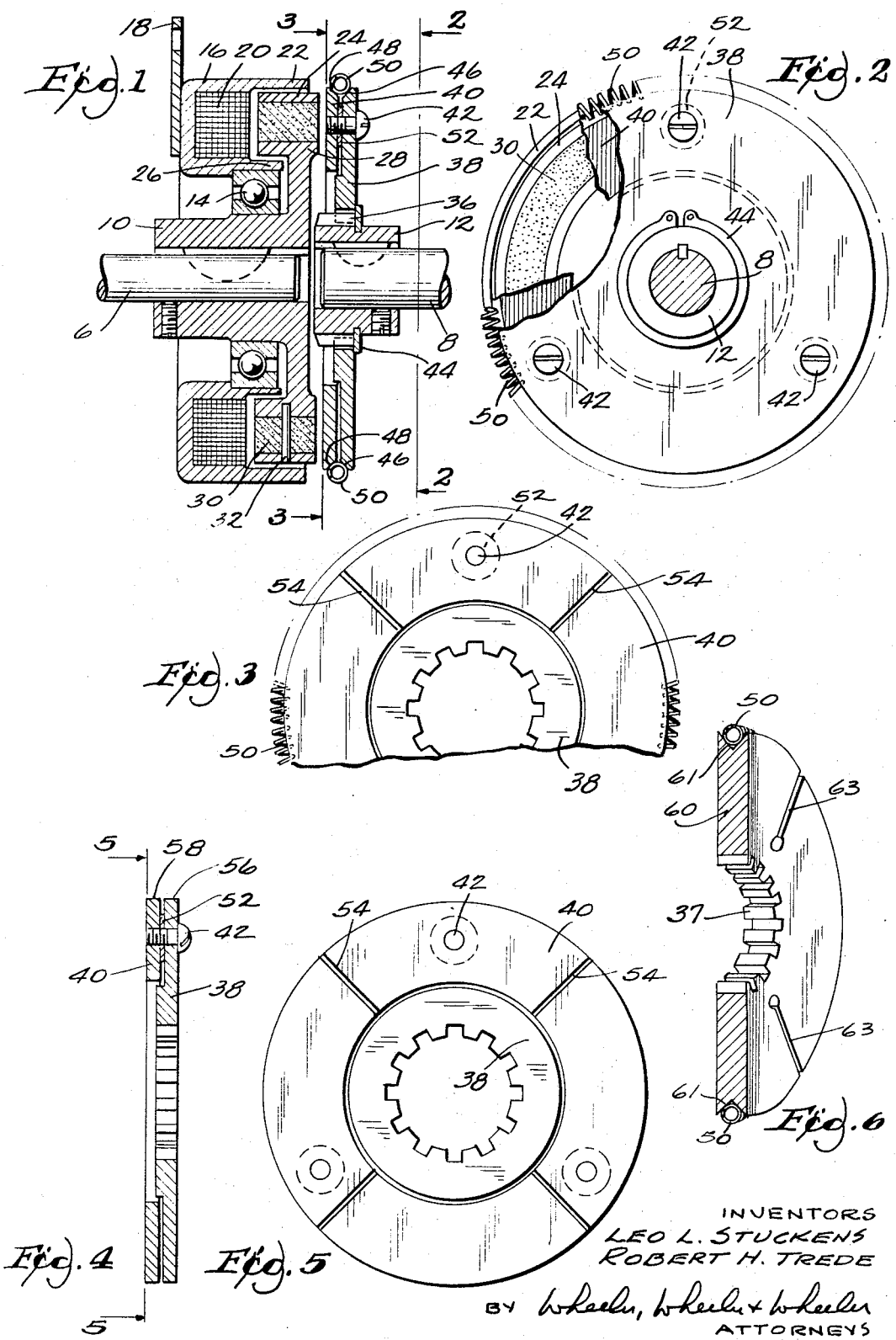

3,326,343
ELECTROMAGNETIC CLUTCH OR BRAKE WITH ARMATURE DYNAMICALLY DAMPED AGAINST AUDIBLE VIBRATION
Leo L. Stuckens and Robert H. Trede, both of Milwaukee, Wis., assignors to Stearns Electric Corporation, Milwaukee, Wis., a corporation of Wisconsin
Filed Aug. 23, 1965, Ser. No. 481,789
7 Claims. (Cl. 192—84)

This invention relates to an electromagnetic clutch or brake with armature dynamically damped against audible vibration.

For the purpose of exemplifying the invention, it is described as a clutch but with the understanding that the terms used are equally applicable without change to a brake. From the standpoint of the invention, the only difference between a brake and a clutch depends upon whether the engageable parts are both rotatable or whether one of them is fixed. In all such mechanisms, there is a tendency for squeal to develop as the result of vibrations in an audible range which occur in the normal functioning of the device.

The present invention damps vibration in the armature disk by encircling the disk ith a toroidal spring under tension which desirably is nearly fully exposed to the atmosphere instead of being in mechanical connection or in frictional contact with any other part. Such a spring functions to rid the disk of the annular component of the vibration, first, by sharply reducing reflection of vibrations from the outer rim of armature disk and the air-metal boundary, thus preventing reinforcement and build-up. This result is accomplished by breaking up the boundary continuity at the points where the successive turns of the helically wound tension spring contact the rim of the armature disk. Secondly, the spring accomplishes its damping function by furnishing paths through which portions of the vibration may be transferred to the spring coils through the points of contact. Finally, the spring functions to damp vibration by dissipating the vibrational energy in the form of heat as the coils are flexed and caused to acceltrae and decelerate while exposed to air. Since the largest proportion of the vibration which results in audible noise is in the annular component, the noise is effectively reduced or eliminated in a manner which would not be possible except for the fact that the outer peripheral portions of the tension coil spring are exposed and free of contact with any other part.

In order to function properly, the wire of which the spring is made should be large enough to have a substantial moment of inertia about an axis located at the outer diameter of the armature, which would be the innermost diameter of each coil. It must also have a coil diameter large enough to give substantial values for the radius of gyration about the outer diameter of the coil as an axis. The tension of the spring must be sufficient to ensure complete contact between individual coils and the periphery of the armature at the highest rotative speed which is contemplated. When these conditions are fulfilled, there is a transfer of energy from the armature to the coils, where the energy accelerates individual coils in simple harmonic motion, the energy thus used being dissipated to air as frictional heat. As will be shown hereinafter, any remaining vibration is below audible range.

When there is any substantial axial component of vibration that contributes to the noise, other means can be used for the control thereof as disclosed, for example, in a companion application of Bernard E. Wrensch and Lloyd A. Fitzgerald, Ser. No. 481,858, filed Aug. 23, 1965.

In one preferred arrangement using a tensioned encircling spring, as well as in a modified embodiment in which the spring is omitted, the armature disk is made in two parts connected at spaced points in a plane to which axis of rotation is normal. When the spring is employed, these parts have complementary beveled peripheral portions which cooperate to provide a shallow channel in which the helical spring is seated. When the spring is not used, the peripheries of the two components may be cylindrical, if desired. A further form embodies a disk slotted at about three locations spaced about the periphery, the slots ending short of the central opening, and a tensioned encircling spring being provided. In any case, it is found that the multiple or slotted disk construction damps sound waves and tends, in certain ranges of frequency, to eliminate audible sound. When used with the spring, the components, in so far as they vibrate independently of each other, will set up different vibrations in the spring, thereby damping audible frequencies more effectively than can be done with a one-piece armature, even when an encircling spring is used.

In an alternative arrangement using the spring, the armature disk does not comprise separate plates but is a single plate with radial slots. Three slots have been used successfully but the number does not appear critical.

In the drawings:

FIG. 1 is a view in axial section through a brake embodying the invention.

FIG. 2 is a view in end elevation showing the shaft in section, parts being broken away.

FIG. 3 is a fragmentary view taken in transverse section on the line 3—3 of FIG. 1.

FIG. 4 is a detail view showing a modified armature structure in transverse section, as in FIG. 1, the encircling toroidal spring being omitted.

FIG. 5 is a view similar to FIG. 3 showing the armature assembly of FIG. 4 in rear elevation.

FIG. 6 is a view in perspective section showing a further modified embodiment of the invention.

As already indicated, there is no essential difference between a clutch and a brake from the standpoint of the present invention. It is ascertainable that the device shown in FIG. 11 is a clutch because both of the frictionally engageable parts are rotatable with respective axially aligned shafts, the rotatable magnet poles being energized from a relatively fixed magnetic coil.

The shafts 6 and 8 are coaxial. Keyed to them respectively are the hub 10 and the hub 12. Either may be the driver. For purposes of this exposition, it may be assumed that hub 10 drives and hub 12 is driven.

Bearing 14 is used between hub 10 and the magnet frame 16, which has an arm 18 securing it against rotation. Within the magnet frame is a winding 20 having suitable electrical connections for its energization. The annular poles 22 and 26 are in close proximity to outer polar extension 24 and inner annular polar extension 28, both of which are connected with hub 10 for rotation. The inner pole member 28 is mounted directly on hub 10. Surrounding it is an annulus 30 of friction clutch material peripherally engaged by polar extension 24. Preferably, radial pins 32 of relatively non-magnetic material provide mechanical connection between the outer and inner polar extensions 24 and 28.

The driven hub 12 has splines at 36. The armature back plate 38 has complementary splines engaged with splines 36 to accommodate relative axial movement between the armature and driven hub while constraining the armature and driven hub to rotate in unison. The armature friction plate 40 is held to the armature back plate 38 by mounting screws 42, three being shown. A split ring 44 limits the extent to which the armature can move away from friction clutch insert 30.

The armature back plate 38 has its periphery beveled as shown at 46. The armature friction plate 40 has a complementary bevel 48. In the groove provided by the opposing bevels 46 and 48 is a toroidal tension spring 50. The sole function of this spring is to damp vibration. It is not required to hold the plates 38 and 40 in any prescribed relation, since the screws 42 are preferably fixed in threads provided for them in the friction plate 40, and are held by lock washers 52 against release.

While the number and placement of these screws might theoretically have an effect on damping vibrations, creating resonance or non-resonance to some certain frequency according to screw locations, this consideration is merely theoretical and is not depended upon.

Referring for the moment solely to the effect of the toroidal tension spring 50, an example is given to show that this alone will suffice to dissipate the energy responsible for audible noise. It will be understood that the particulars are given solely by way of example and not by way of limitation.

Assuming a three inch diameter armature peripherally encircled by a toroidal spring having wire .025″ in diameter, the coil having a mean diameter of .250″, it will be apparent that the surface area exposed to the atmosphere will total more than six square inches. Under normal operating conditions, this area will dissipate over 1 watt of audio power. This amount of energy is considerably more than can normally be expected to be developed in a device of this kind in which objectionable noise might otherwise occur.

Not only does the spring have ample area for the dissipation in the form of heat of all absorbed energy, but it also has a damping effect such that the energy in question is readily taken from the armature plate in the event that the plate tends to vibrate. Considering the individual coils of the spring as vibrating bodies which tend to oscillate about the points of contact between the respective coils and the edges of the armature disk, and assuming them to have the dimensions indicated, the radius of gyration about the edge is .163″. The moment of inertia I about the same axis is $9.3 \times 10^{-8}$ lb. in.$^2$.

When W equals the weight in pounds, H equals the distance of the axis from the center of gravity of the coil, and E equals $OD/2$, the period of vibration equals $2 \text{pi} \times (I/Wh)^{1/2} = .154$ sec.

This is a period of vibration far below the audible range and hence no perceptible noise results.

As already indicated, the spring has to be made of wire large enough to have a substantial value for I. It must also have a mean diameter of coil large enough to give substantial values for the radius of gyration about the OD of the armature as an axis. The spring must be under sufficient tension to ensure complete contact between the individual coils and the armature at the highest contemplated speed. When all these conditions are fully met, there is effective transfer of energy from the armature to the spring coils such that the coils accelerate and decelerate in simple harmonic motion. This generates heat. The surface area of the coil is adequate to dissipate this heat to the air.

FIGS. 4 and 5 show armatures in which sound vibrations are damped simply by reason of the fact that the armature back plate and friction plate are separately prefabricated and fastened together. In the armature assembly of FIGS. 4 and 5, the damping action is further facilitated by the provision of generally radial kerfs or saw slots 54 in the annular friction face plate 40. These kerfs are shown both in FIG. 3 and FIG. 5 so there is no difference between the two armatures in this regard. The only essential difference consists in the omission of the spring 50 from the armature shown in FIGS. 4 and 5. Here the peripheral portions 56 and 58 of the armature back plate and the armature friction plate may be generally cylindrical because it is not necessary to provide a bevel for a spring seat.

In the construction of FIG. 6 the armature comprises a single disk 60 with spring locating means comprising, in this example, a peripheral groove 61 in which the toroidal spring 50 is disposed. The disk is splined at 36 about the opening 37 for a similarly splined shaft or hub. It is subdivided into segments by a plurality of slots 63. The number of slots does not appear to be crictical. The use of two, three or four is suggested for a small armature.

The embodiments disclosed suppress noise in several ways. The device of FIG. 6 operates similarly to the device of FIGS. 1 to 3 so far as the spring is concerned. However, the provision of the slots which subdivides the armature disk 60, FIG. 6, into individual segments appears to contribute to the desired functioning of the spring by facilitating the transfer of circumferential vibrations to the spring.

In those constructions using a multiple plate armature, the attachment of the backing plate to the armature plate increases the mass of the body in which the vibration occurs, thus reducing amplitude of vibration. By shortening the annular distance available for vibration, an earlier reflection from the metal-air boundary produced by the kerfs 54 increases the opportunity for interference between successive waves and reflected waves. Finally, the reduction in mass of the armature friction face in which the vibration originates raises the point at which it is independently resonant and thereby increases the disparity between its resonant frequency and that of the armature as a whole.

All of these factors tend to damp the vibration of audible frequencies and are effective to substantially eliminate noise resulting from friction in the operation of the device.

We claim:

1. In a clutch or the like in which an armature is drawn by an electromagnet to a friction surface, an armature comprising a hub, a back plate and a friction plate in substantially parallel relationship, one of said plates having driving connection with the hub, means for connecting said plates with each other in spaced relationship, and means for absorbing audible vibration and comprising a coil spring encircling the armature peripherally, said back plate and friction plate having complementary beveled margins forming a channel in which said coil spring is seated, substantially every coil of said spring being engaged with at least one of the plates on the inner periphery of the spring and being freely exposed to the atmosphere elsewhere.

2. An armature according to claim 1 in which the spring comprises wire of substantial mass and exposed surface area, each coil having sufficient diameter to provide a substantial radius of gyration with respect to its engagement with the periphery of the armature.

3. An armature according to claim 1 in which said connecting means comprises a plurality of screws having heads engaged with the back plate and threads screwed into the friction plate, there being washers intervening between said plates and encircling said screws.

4. An armature according to claim 1 in which at least one of said plates is provided with generally radial kerfs.

5. In an electromagnetic clutch having an electromagnet and an armature and means providing a friction surface to which the armature is drawn when the electromagnet is energized the improvement which consists in an armature comprising segments provided with means connecting them for rotation in unison, said segments having generally radial margins, the margins of adjacent segments being circumferentially spaced and the armature being peripherally provided with a toroidal spring encircling the armature under tension, each coil having an inner peripheral portion engaging at least portions of the several segments, said coil having an outer peripheral portion free to vibrate in a circumeferential direction and exposed to the air.

6. A clutch or the like according to claim 5 in which the armature comprises a disk having a plurality of slots intersecting its periphery forming said segments and extending from an area near its center.

7. In a clutch or the like in which an armature is drawn by an electromagnet into engagement with a friction surface and has means supporting it for rotation with respect to said surface, the improvement which consists in a plurality of segments disposed in annular series and constituting said armature and provided with means connecting them and mounting them for rotation, the several segments having free generally radial margins mutually spaced and constituting means for dissipating audible vibration by reflection from metal-air boundaries at said margins, the peripheries of said segments being encircled by a toroidal spring having coils individually in contact at the inner periphery of the spring with the several segments aforesaid whereby the segments will individually transfer vibration to the coils of the spring.

References Cited
UNITED STATES PATENTS

| | | | |
|---|---|---|---|
| 1,846,257 | 2/1932 | Huck. | |
| 1,935,393 | 11/1933 | Dodge. | |
| 2,876,879 | 3/1959 | Maurice et al. | 192—84 |
| 2,936,054 | 5/1960 | Simon et al. | 192—84 |
| 3,036,680 | 5/1962 | Jaeschke | 192—84 |
| 3,172,514 | 3/1965 | Hansen | 192—84 |
| 3,189,150 | 6/1965 | Chapman | 192—84 |
| 3,204,737 | 9/1965 | Anner | 192—105 |

MARK NEWMAN, *Primary Examiner.*

ARTHUR T. McKEON, *Examiner.*